(12) United States Patent
Lalwala et al.

(10) Patent No.: US 12,479,384 B2
(45) Date of Patent: Nov. 25, 2025

(54) AIRBAG AND RESTRAINT SYSTEM CONTROL USING SEAT PRESSURE DATA

(71) Applicant: GM Global Technology Operations LLC, Detroit, MI (US)

(72) Inventors: Mitesh Lalwala, Troy, MI (US); Chin-Hsu Lin, Troy, MI (US); Nilesh D. Mankame, Ann Arbor, MI (US); Alok Warey, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 18/506,515

(22) Filed: Nov. 10, 2023

(65) Prior Publication Data
US 2025/0153671 A1   May 15, 2025

(51) Int. Cl.
*B60R 21/015* (2006.01)
*B60R 21/0136* (2006.01)
*B60R 21/013* (2006.01)
*B60R 21/0132* (2006.01)

(52) U.S. Cl.
CPC .... *B60R 21/01566* (2014.10); *B60R 21/0136* (2013.01); *B60R 21/01516* (2014.10); *B60R 21/01538* (2014.10); *B60R 2021/01302* (2013.01); *B60R 2021/01304* (2013.01); *B60R 21/0132* (2013.01)

(58) Field of Classification Search
CPC .......... B60R 21/01566; B60R 21/0136; B60R 21/01516; B60R 21/01538; B60R 21/0132; B60R 2021/01302; B60R 2021/01304; B60R 21/01552; B60R 21/01554

See application file for complete search history.

(56) References Cited

U.S. PATENT DOCUMENTS

| | | | | |
|---|---|---|---|---|
| 6,272,411 | B1 * | 8/2001 | Corrado | G06V 10/147 701/45 |
| 10,424,183 | B1 * | 9/2019 | Kahn | G08B 21/24 |
| 10,676,058 | B2 * | 6/2020 | Ghannam | B60R 21/16 |
| 2004/0065497 | A1 * | 4/2004 | Roelleke | B60R 21/01516 180/282 |
| 2004/0068354 | A1 * | 4/2004 | Tabe | B60R 22/48 701/45 |
| 2004/0206904 | A1 * | 10/2004 | Djordjevic | B60N 2/0024 250/330 |
| 2005/0156457 | A1 * | 7/2005 | Breed | B60N 2/015 297/467 |

(Continued)

FOREIGN PATENT DOCUMENTS

| | | |
|---|---|---|
| DE | 69404813 T3 | 3/1998 |
| DE | 10144878 A1 | 9/2002 |

(Continued)

*Primary Examiner* — Sze-Hon Kong
(74) *Attorney, Agent, or Firm* — Vivacqua Crane, PLLC (57) ABSTRACT

A vehicle airbag and restraint system includes a vehicle seat positioned in a vehicle. At least one pressure sensor is included with the vehicle seat to sense when a user is in contact with the vehicle seat. At least one airbag is opened in response to a vehicle crash event. A controller determines when the user is seated on the vehicle seat in a position different than a normally upright position thereby defining the user being out-of-position, and generates a signal applied by the controller to modify an opening sequence of the at least one airbag when the user is out-of-position.

15 Claims, 5 Drawing Sheets

(56) References Cited

U.S. PATENT DOCUMENTS

| | | | |
|---|---|---|---|
| 2007/0096446 A1* | 5/2007 | Breed | B60R 21/2338 280/735 |
| 2007/0096447 A1* | 5/2007 | Tabe | B60R 21/017 280/735 |
| 2009/0027188 A1* | 1/2009 | Saban | B60N 2/268 340/439 |
| 2009/0200777 A1* | 8/2009 | Webber | B60R 21/26 280/736 |
| 2012/0126519 A1* | 5/2012 | Ohara | B60R 21/01516 280/735 |
| 2015/0191122 A1* | 7/2015 | Roy | G08G 1/096827 340/439 |
| 2019/0003877 A1* | 1/2019 | Aina | G01G 19/12 |
| 2020/0353886 A1* | 11/2020 | Robertson | B60R 21/01542 |
| 2021/0300275 A1* | 9/2021 | Thomas | B60R 21/01516 |
| 2022/0063542 A1* | 3/2022 | Sakurai | B60R 21/01554 |
| 2022/0114817 A1* | 4/2022 | Gronau | G06V 40/10 |
| 2022/0289088 A1* | 9/2022 | Michielan | B60N 2/0296 |
| 2023/0001875 A1* | 1/2023 | Ukita | B60R 21/276 |
| 2023/0168364 A1* | 6/2023 | Podkamien | G01S 13/582 701/45 |
| 2024/0172946 A1* | 5/2024 | Golombek | G16H 50/70 |
| 2024/0270192 A1* | 8/2024 | Jakobs | B60R 21/0153 |
| 2025/0033533 A1* | 1/2025 | Heurlin | B60N 2/0273 |

FOREIGN PATENT DOCUMENTS

| | | |
|---|---|---|
| DE | 10227286 A1 | 1/2004 |
| DE | 10246055 A1 | 4/2004 |
| DE | 102005050505 A1 | 4/2007 |
| DE | 102006038140 A1 | 2/2008 |
| DE | 102007015419 A1 | 10/2008 |
| DE | 102010054743 A1 | 6/2012 |
| DE | 102015207805 A1 | 11/2016 |
| DE | 102017007771 A1 | 2/2019 |

* cited by examiner

AIRBAG AND RESTRAINT SYSTEM CONTROL USING SEAT PRESSURE DATA

INTRODUCTION

The present disclosure relates to airbags and restraint control systems for vehicles.

Vehicle airbag and restraint control systems commonly initiate operation of a vehicle airbag and restraint systems if the vehicle is involved in a vehicle crash event. If deployment of an airbag/restraint system such as a seat belt retractor, a knee airbag, a side curtain airbag and the like occurs when the seat user is out-of-position such as when the user's legs are off the vehicle floor and/or up onto a control and instrumentation panel, or when the user is leaning excessively forward or sideward, the airbag may make ineffective or harmful contact with the user.

Thus, while current systems and methods to initiate airbag and restraint operations achieve their intended purpose, there is a need for a new and improved system and method to control airbag and restraint operations if the user is out-of-position.

SUMMARY

According to several aspects, a vehicle airbag and restraint system includes a vehicle seat positioned in a vehicle. At least one pressure sensor is included with the vehicle seat to sense when a user is in contact with the vehicle seat. At least one airbag is opened in response to a vehicle crash event. A controller determines when the user is seated on the vehicle seat in a position different than a normally upright position thereby defining the user being out-of-position, the controller when the user is out-of-position generating a signal to modify an opening sequence of the at least one airbag.

In another aspect of the present disclosure, the vehicle seat includes a seat base and a seat back which rotates with respect to the seat base; and the at least one pressure sensor is positioned in at least one of the seat base and the seat back.

In another aspect of the present disclosure, the at least one pressure sensor includes a forward pressure sensor and a rearward pressure sensor positioned rearward of the forward pressure sensor in the seat base, and a lower pressure sensor and an upper pressure sensor positioned above the lower pressure sensor in the seat back.

In another aspect of the present disclosure, the forward pressure sensor and the rearward pressure sensor independently generate pressure signals when the user is positioned on the seat base and apply pressure to one or both of the forward pressure sensor and the rearward pressure sensor; and the lower pressure sensor and the upper pressure sensor independently generate pressure signals when the user contacts the seat back and applies pressure to one or both of the lower pressure sensor and the upper pressure sensor.

In another aspect of the present disclosure, the at least one pressure sensor defines multiple pressure sensors matrixed into an array and disposed in a mat.

In another aspect of the present disclosure, the user when seated on the vehicle seat and positioned against the seat back with the seat back in the normally upright position being in a direct path of the at least one airbag when the at least one airbag opens during the vehicle crash event.

In another aspect of the present disclosure, the at least one pressure sensor generates pressure signals defining a user pressure profile.

In another aspect of the present disclosure, a user warning is generated if the user is out-of-position.

In another aspect of the present disclosure, the vehicle seat is positioned in a reclined position or a semi-reclined position; and/or the user is out-of-position if the user has one or both user legs raised upward to rest one or both user feet on a control and instrumentation panel.

In another aspect of the present disclosure, the user is out-of-position if the user is leaning forward in a forward direction and out of contact with the seat back if the at least one airbag releases; and the user is out-of-position if the user is leaning outward if the at least one airbag releases.

According to several aspects, a vehicle airbag and restraint system includes a vehicle seat positioned in a vehicle. Multiple pressure sensors are included with the vehicle seat to sense when a user is in contact with different elements of the vehicle seat, including a seat base and a seat back. A user restraint element is provided with the vehicle seat. At least one airbag is opened in response to a vehicle crash event. A controller determines a user posture of the user seated on the vehicle seat. The controller including the user posture to infer the user is out-of-position to generate a signal to perform a dynamic suppression of the at least one airbag and a modification of the user restraint element.

In another aspect of the present disclosure: a seat pressure profile is determined from the at least one pressure sensor; a comfort strategy for the user is generated by the controller and applied to adjust multiple comfort elements to provide support and comfort for the user posture; and an unsafe user position is determined from the user posture via the seat pressure profile and applied to initiate the dynamic suppression of the at least one airbag and the modification of the user restraint element.

In another aspect of the present disclosure, the unsafe user position when determined is used to generate a warning to the user.

In another aspect of the present disclosure, a nature and frequency of the warning is adjusted based on user preferences, including: an uncomfortable posture is defined as one of an excessive load on a lower back of the user, or an uneven pressure distribution of the user on the vehicle seat compared to a predetermined pressure distribution; and a user comfort is personalized using user comfort preferences saved by the user.

In another aspect of the present disclosure, the user comfort preferences define a preferred pressure profile used as an input for a user centric detection.

In another aspect of the present disclosure, an unsafe user posture is pre-defined when the user posture increases a risk for the user during the vehicle crash event.

In another aspect of the present disclosure, inertial sensor data from the vehicle seat is applied by the controller to account for vehicle motion and vibration on a contact pressure of the user sensed by the multiple pressure sensors; and information from vehicle sensors related to road conditions including pot holes, rumble strips and speed bumps, and traffic conditions are applied by the controller to mitigate false positive signals directing the dynamic suppression of the at least one airbag and modification of the user restraint element.

According to several aspects, a method for controlling vehicle airbag and restraint system, comprises: positioning a vehicle seat in a vehicle; providing at least one pressure sensor with the vehicle seat to sense when a user is in contact with the vehicle seat; opening at least one airbag in response to a vehicle crash event; operating a controller to determine when the user is seated on the vehicle seat in a position different than a normally upright position thereby defining the user being out-of-position; and generating a signal applied by the controller to modify an opening sequence of the at least one airbag when the user is out-of-position.

In another aspect of the present disclosure, the method further includes: determining a seat pressure profile from the at least one pressure sensor; and generating a comfort strategy of the user by the controller and applying the comfort strategy to adjust multiple comfort elements to provide support and comfort for the user posture.

In another aspect of the present disclosure, the method further includes: identifying a user position via the seat pressure profile; modifying a user restraint element condition; and notifying the user when the user is out-of-position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

When a component, element or layer is referred to as being "on", "engaged to", "connected to", or "coupled to" another element or layer, it may be directly on, engaged, connected or coupled to the other component, element, or layer, or intervening elements or layers may be present. In contrast, when an element is referred to as being "directly on", "directly engaged to", "directly connected to", or "directly coupled to" another element or layer, there may be in intervening elements or layers present. Other words used to describe the relationship between elements should be interpreted in a like fashion, such as "between" versus "directly between", "adjacent" versus "directly adjacent", and the like. As used herein, the term "and/or" and "one or both" include any and all combinations of one or more of the associated listed items.

Figure 1:
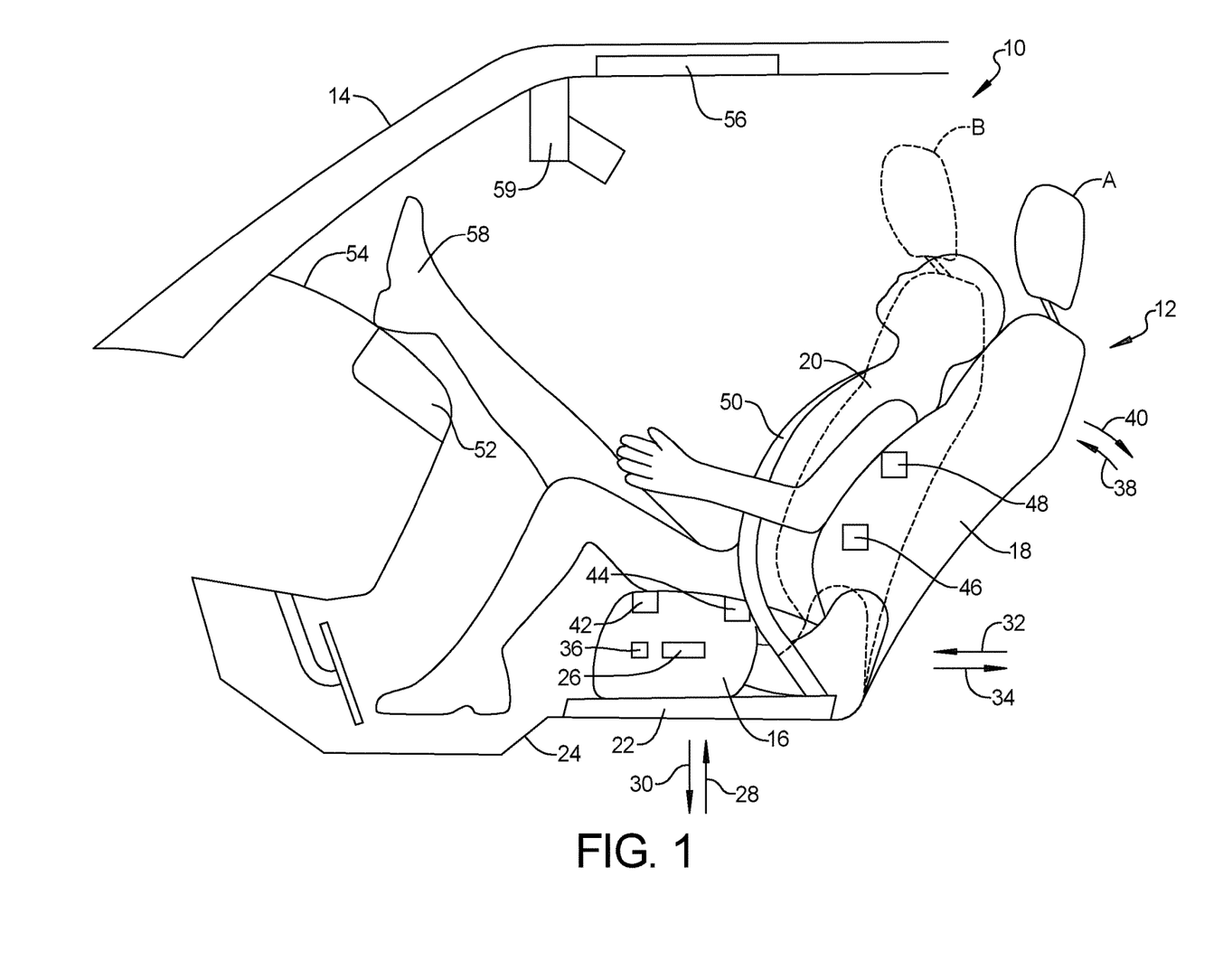
FIG. 1 is a side elevational view of a vehicle airbag and restraint system according to an exemplary aspect.

Referring to FIG. 1, a vehicle airbag and restraint system 10 includes a vehicle seat 12 provided in a vehicle 14. According to several aspects, the vehicle 14 may be an automobile, a truck, a sport utility vehicle, a battery electric vehicle, a hybrid vehicle, a van or the like. According to several aspects the vehicle 14 may include one or multiple ones of the vehicle seat 12. The vehicle seat 12 includes a seat cushion or seat base 16 and a seat back 18 which rotates with respect to the seat base 16. An exemplary user 20 defining for example a passenger occupant, is presented in a fully reclined position on the vehicle seat 12. The user 20 may also include an operator of the vehicle 14 or a customer riding in and being driven to a predetermined destination of the vehicle 14. The user 20 may elect to change positions of the seat base 16 and the seat back 18. To accomplish seat position changes, the vehicle seat 12 is slidably supported on a rail frame 22 which is fixed to a vehicle structural frame 24. To adjust a position of the seat base 16, a first seat position switch 26 is actuated by the user 20 to slidably displace the seat base 16 in an upward direction 28, an opposed downward direction 30, a forward direction 32 and an opposed rearward direction 34. To adjust a position of the seat back 18, a second seat position switch 36 allows the user 20 to rotate the seat back 18 in a forward arc of rotation 38 and an opposed rearward arc of rotation 40. The user 20 may adjust positions of the seat back 18 for example by rotating the seat back 18 in the rearward arc of rotation 40 between the fully reclined seat back position A shown and a normally upright position B (shown in phantom).

The seat base 16 of the vehicle seat 12 is further equipped with at least one forward pressure sensor 42 and at least one rearward pressure sensor 44 positioned rearward of the forward pressure sensor 42 in the rearward direction 34. The forward pressure sensor 42 and the rearward pressure sensor 44 independently generate pressure signals when the user 20 is positioned on the seat base 16 and thereby applies pressure to one or both of the forward pressure sensor 42 and the rearward pressure sensor 44. The seat back 18 of the present disclosure also includes at least one lower pressure sensor 46 and at least one upper pressure sensor 48 positioned above the lower pressure sensor 46 in the upward direction 28. The seat back lower pressure sensor 46 and the upper pressure sensor 48 independently generate pressure signals when the user 20 contacts at least a portion of the seat back 18 and thereby applies pressure to one or both of the lower pressure sensor 46 and the upper pressure sensor 48 of the seat back 18. A seat belt 50 defines a portion of a restraint system which is also controlled by the vehicle airbag and restraint system 10. For example, a seat belt retractor force and firing time may be modified based on conditions sensed by the vehicle airbag and restraint system 10.

According to several aspects, the at least one forward pressure sensor 42, the at least one rearward pressure sensor 44, the at least one lower pressure sensor 46 and the at least one upper pressure sensor 48 may be replaced by a mat having multiple pressure sensors matrixed into an addressable array in lieu of discrete pressure sensors. A single mat having matrixed pressure sensors may be used with both the seat base 16 and the seat back 18, or the seat base 16 may have a first mat and the seat back 18 may have a second mat.

The vehicle 14 further includes at least one airbag, such as a first airbag 52 mounted in a control and instrumentation panel 54, and a side curtain or second airbag 56. The first airbag 52 optimally deploys rearwardly in the rearward direction 34 and toward the user 20 to mitigate against user contact with the control and instrumentation panel 54 during a vehicle impact event and to minimize forward displacement of the user 20. The second airbag 56 optimally deploys inwardly toward the user 20 and toward the viewer as shown in FIG. 1 to mitigate against the user 20 contacting a vehicle door window or door structure and to minimize side displacement of the user 20 during a vehicle side impact event.

The user 20 is commonly seated on the vehicle seat 12 in the normally upright position B when the user 20 is driving. When the user 20 is a passenger it is known that the user 20 may also position the vehicle seat 12 in the reclined position A, for example to sleep. During this time, the user 20 may also raise one or both user legs upward to rest one or both user feet 58 on the control and instrumentation panel 54 wherein the user 20 is also defined as being out-of-position to be protected by normal opening contact of the airbag with the user 20. Release of the first airbag 52 when the user 20 is defined as being out-of-position may permit the first airbag 52 to contact the user feet 58 and legs prior to contacting the chest and head of the user 20 which may result in injury to the user 20. The user 20 when defined as a passenger may also position the vehicle seat 12 in a semi-reclined position between the normally upright position B and the reclined position A to allow the user 20 to relax, wherein the user 20 is also defined as being out-of-position to be protected by normal opening contact of the airbag with the user 20. In addition, the user 20 may also be out-of-position if the user 20 is leaning forward in the forward direction 32 and out of contact with the seat back 18 and thereby is positioned proximate to the control and instrumentation panel 54 which may result in injury to the user 20 if the first airbag 52 releases. The user 20 may further be deemed to be out-of-position if the user 20 is leaning outward and away from the viewer as viewed in reference to FIG. 1 and therefore is positioned beneath the second airbag 56. Release of the second airbag 56 may not protect the user 20 from contacting vehicle structure or a window in this out-of-position condition.

According to further aspects, the user 20 is defined as being out-of-position when a fraction of an occupant weight carried by one or both of the seat base 16 and/or the seat back 18 is significantly different relative to the user body weight distribution in the normally seated or normally upright position B. According to further aspects, the user 20 is defined as being out-of-position when a user center of pressure the seat base 16 and/or on the seat back 18 shifts significantly relative to the center of pressure of the user 20 on the seat base 16 and/or or on the seat back 18 in the normally seated or normally upright position B. According to several aspects, an in-vehicle camera system 59 having one or more cameras located within the vehicle 14 may also be operated to identify out-of-position conditions of the user 20 as a driver or a passenger.

Referring to FIG. 2 and again to FIG. 1, to provide broad pressure sensor coverage of the seat base 16 and the seat back 18, the vehicle seat 12 may include additional pressure sensors as follows. In addition to the seat base forward pressure sensor 42 and the seat base rearward pressure sensor 44, the seat base 16 includes a seat base second forward pressure sensor 60 and a seat base second rearward pressure sensor 62 spatially separated from the seat base forward pressure sensor 42 and the seat base rearward pressure sensor 44 accordingly. In addition to the at least one lower pressure sensor 46 and at the least one upper pressure sensor 48, the seat back 18 further includes a second lower pressure sensor 64 and a second upper pressure sensor 66.

Figure 2:
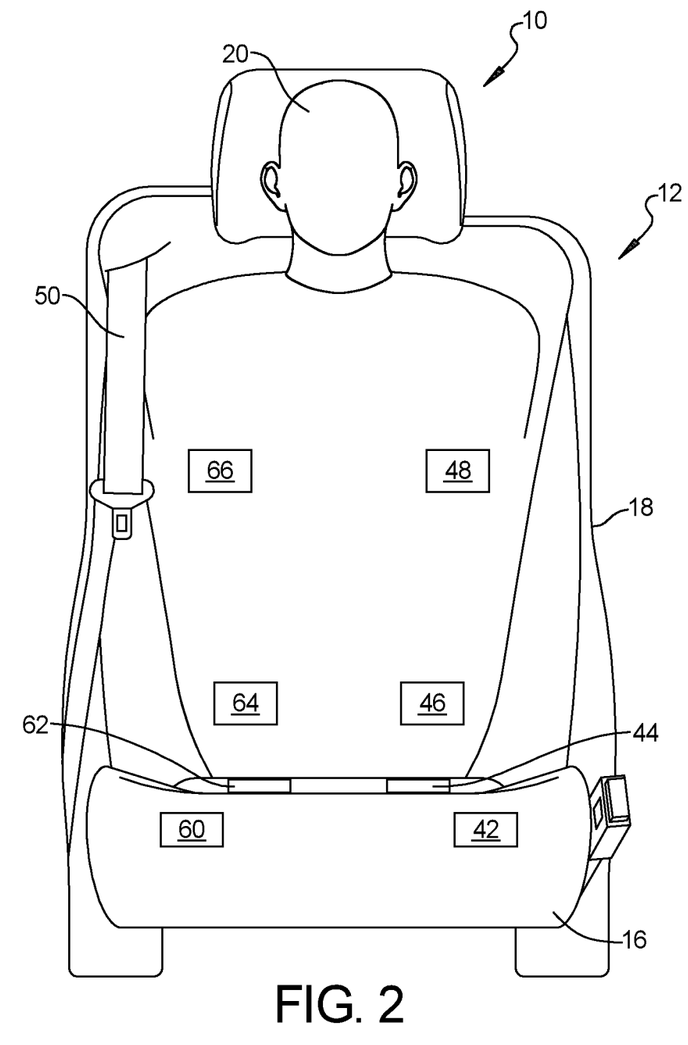
FIG. 2 is a front elevational view of a configuration of seat pressure sensors for the vehicle airbag and restraint system of FIG. 1.

Referring to FIG. 3 and again to FIGS. 1 and 2, in order to identify user 20 out-of-position conditions which impact when a vehicle airbag should be or should not be energized open or if different airbags may be sequentially opened, the vehicle airbag and restraint system 10 includes a user posture detection portion 68 which identifies a user posture 69. The user posture 69 may include elements including a body position, a leg position, a head position, a seat position and the like. According to several aspects the vehicle seat 12 includes position sensors to identify items including a seat base 16 front/back/pitch position and a seat base height, a seat back 18 angular orientation and a head rest position. The following items are identified and applied to determine the user posture 69: a seat contact pressure 70 is identified; vehicle dynamics data 72 such as vehicle speed, acceleration, braking action, steering activity and the like are collected; a vehicle interior geometry 74 including a seat profile and position are identified; and previously saved occupant or user comfort preferences 76 are identified, which may be retrieved from a memory 77. A posture detection analyzer 78 which may define an algorithm collects the seat contact pressure 70, the vehicle dynamics data 72, the vehicle interior geometry 74 and the user comfort preferences 76 and the user posture 69 is determined based on one of multiple approaches including applying posture specific pressure profiles and artificial intelligence and machine learning programs.

Figure 3:
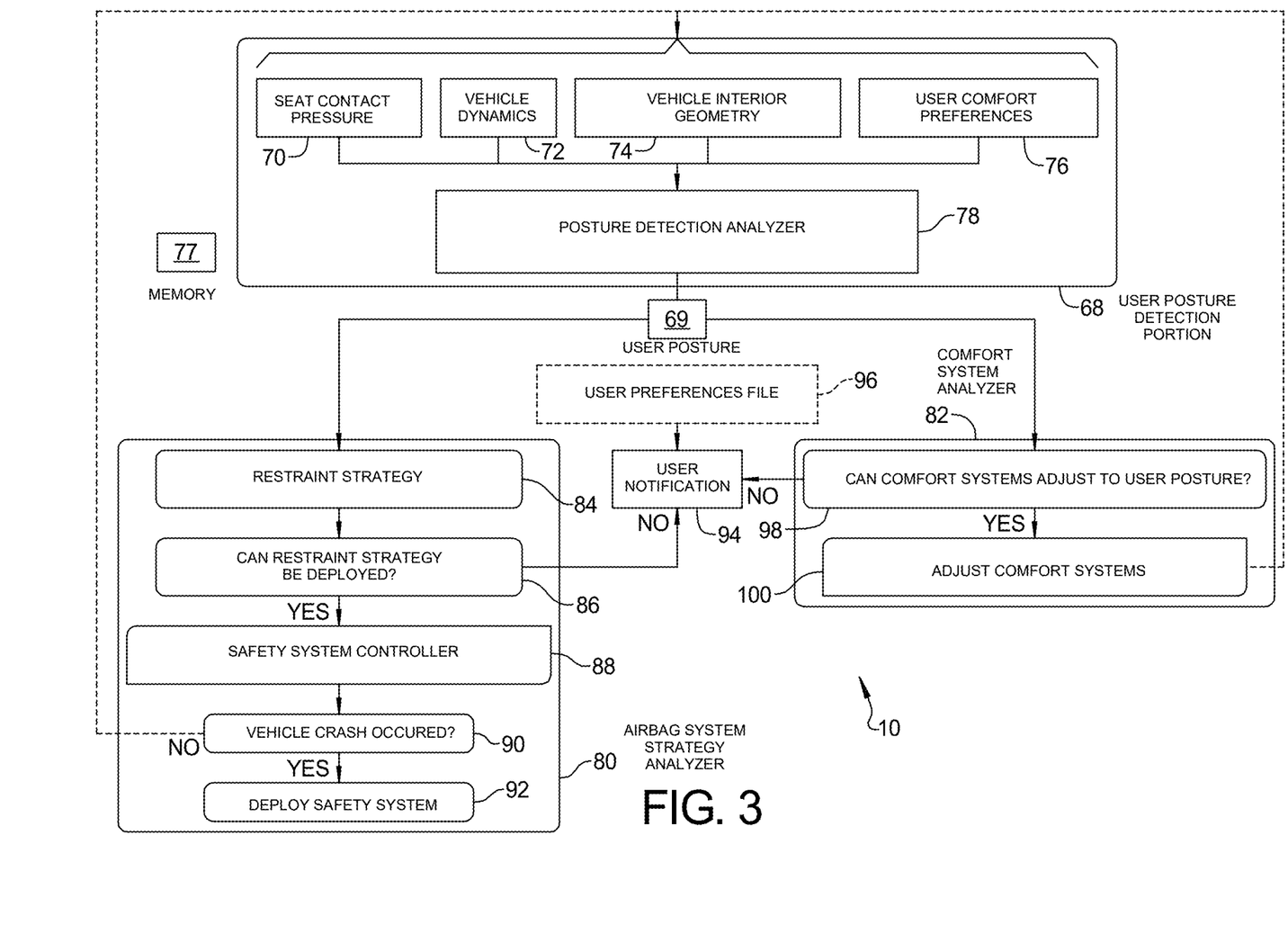
FIG. 3 is a system diagram of the vehicle airbag and restraint system of FIG. 1.

The posture detection analyzer 78 continuously or at a predetermined time interval determines the user posture 69. The user posture 69 defines a data set which is forwarded for further analyses to an airbag system strategy analyzer 80 and a comfort system analyzer 82. The airbag system strategy analyzer 80 performs multiple analyses to identify if airbag deployment modification is required based on the user posture 69. The airbag system strategy analyzer 80 identifies an optimum airbag and restraint strategy 84 and in an analysis step 86 determines if the optimum airbag and restraint strategy 84 may be deployed. If a result of the analysis step 86 identifies the optimum airbag and restraint strategy 84 may be deployed, a safety system controller 88 generates signals to adjust airbag and restraint elements. Following airbag element adjustment, a crash detection sensor 90 is queried to identify if a vehicle crash event has occurred. If a vehicle crash event has not occurred, the program returns to the user posture detection portion 68. If a vehicle crash event has occurred, the program in a deployment step 92 deploys the safety system.

Based on the identified postures and an internal algorithm, the safety system controller 88 adjusts the comfort and safety systems or notifies the user 20 about a potential uncomfortable or unsafe posture. A nature and a frequency of user notifications may be adjusted based on user preferences. For the safety system, the safety system strategy analyzer 80 will identify optimum airbag/restraint strategies and an opening sequence for any airbag or combination of airbags provided with the vehicle 14 for the identified user posture 69 and adjust the restraint elements to mitigate against user risk during a vehicle crash event. The knee airbag or the first airbag 52 is suppressed or a sequence of airbag deployment is modified when more than one airbag is provided if one or more of the user's legs and/or feet 58 are on the control and instrumentation panel 54 or if the user 20 is leaning forward beyond a standard or upright seating position.

If a result of the analysis step 86 identifies the optimum airbag and restraint strategy 84 may not be deployed, a user notification 94 is performed which may visually, audibly, or the like notifies the user 20 that one or more user 20 out-of-position conditions are present. The type of user notification which is employed is predetermined and saved in an occupant or user notification preferences file 96, which may also be retrieved from the memory 77. The user 20 may then elect to change the user position.

In parallel with the airbag system strategy analyzer 80 the comfort system analyzer 82 performs a comfort system analysis 98 to determine if comfort systems may be adjusted to support the current user posture 69. If the comfort system analysis 98 identifies one or more comfort system adjustments may be made, a comfort system controller 100 is activated to generate signals required to adjust comfort system elements. If the comfort system analysis 98 identifies one or more comfort system adjustments may not be made, the user notification 94 is performed to identify to notify the user 20 that one or more user out-of-position conditions are present.

Referring to FIG. 4 and again to FIG. 3, a group 102 containing individual ones of the seat contact pressure 70, the vehicle dynamics data 72, the vehicle interior geometry 74 and the user comfort preferences 76 are analyzed in the posture detection analyzer 78 and analysis results are forwarded to a posture controller 104. An output of the posture controller 104 may be used to generate warnings and notifications 106 such as identified by the user notification 94 above. An on-switch 108 and an off-switch 109 may be selected by the user 20 to further optimize notification selections to be presented.

Figure 4:
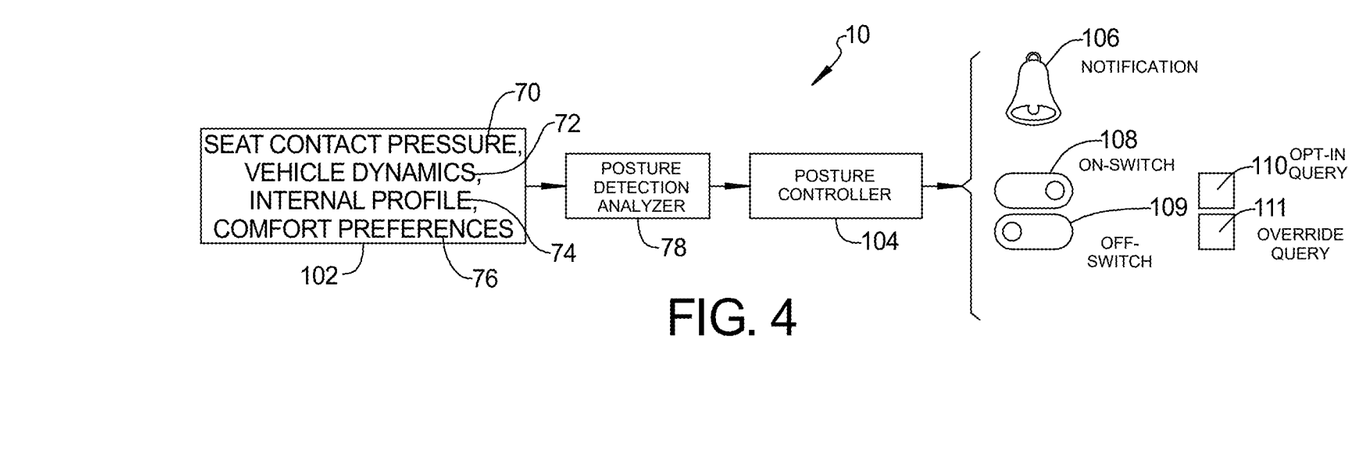
FIG. 4 is a flow diagram for user posture detection of the vehicle airbag and restraint system of FIG. 1.

Input data from the multiple seat sensors may be passed to the posture detection analyzer 78 using multiple disambiguation approaches and is used to detect the user posture 69 described in reference to FIG. 3 and a user position on the vehicle seat 12. The posture detection analyzer 78 may be customized to be a universal algorithm suitable for any vehicle with any user, or a vehicle-centric algorithm which is designed for a specific vehicle for any user, or a user-centric algorithm designed for a specific user in any vehicle.

A posture detection approach may be based on universal user pressure profiles for different postures. Universal user pressure profiles for different positions and postures may be developed for example from a volunteer study saved in a database such as the memory 77 described in reference to FIG. 2 and are used as a reference for identifying different user postures in a detection algorithm. A change occurring in postures and positions is detected using changes in magnitudes of the contact pressure sensed by the pressure sensors and a location or a position of a center of pressure. Relative changes in the magnitude of the contact pressure and the center of pressure may be used to account for different anthropometry of the users 20.

To avoid errors due to noise in an instantaneous pressure signal, the action may be based on a time average signal or by applying Kalman filters for the above algorithms. Additionally, a user nominal pressure profile may be created as a digital identity and may be used as an initial reference for posture change detection in the posture detection analyzer 78, allowing the posture detection analyzer 78 to be personalized.

Long short-term memory (LSTM) ML models may also be used to determine user posture, taking into account user pressure profiles occurring over time instead of only at a single time point.

With continuing reference to FIG. 4, the vehicle airbag and restraint system 10 may also provide a user opt-in capability and a user override capability as follows. At the outset initiation of the vehicle airbag and restraint system 10 the user 20 may opt-in to operation of the system after identification to the user 20 of one or more conditions that may lead to false positive indications. The user 20 may be prompted to respond to an opt-in query 110 such as: "The following conditions may lead to false positive indications. Do you want to enable the vehicle airbag and restraint system using seat pressure data for the present vehicle operation, for the present driver and/or for the present passenger?" The user 20 is provided with an override query 111 when one of the warnings such as from the warnings and notifications 106 noted above is generated that provides the user 20 an option to use the vehicle airbag and restraint system 10 functionality for a predetermined trigger.

Referring to FIG. 5 and again to FIGS. 3 through 4, a possible artificial intelligence/machine learning (AI/ML) approach to determine the user posture 69 applies a 1 dimensional (1D) convolutional neural network (CNN) 112 on 1D time series sensor data 114 followed by long-short term memory (LSTM), or gated recurrent unit (GRU) neural network.

Figure 5:
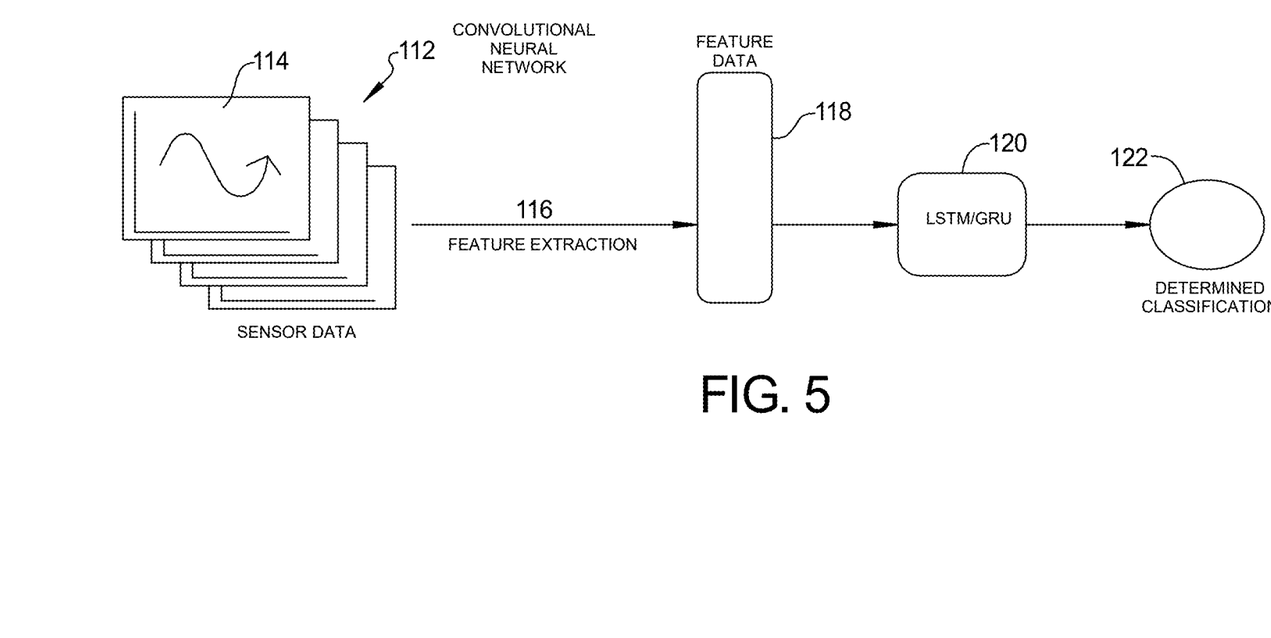
FIG. 5 is a flow diagram for feature extraction using 1D sensor data of the vehicle airbag and restraint system of FIG. 1.

Feature extraction 116 is performed using a 1D CNN on multiple sensor data 112. Feature data 118 identified during the feature extraction 116 is fed to a LSTM/(GRU) 120 to determine a current user posture. The LSTM/GRU 120 takes in a previous n time steps to predict a current time step. In this way the LSTM/GRU 120 has a time history or a look back period, which may be as short as a previous 3-5 time steps. The user posture 69 and a user position together with a determined classification 122 such as ergonomic or non-ergonomic is generated by the LSTM/GRU 120.

Figure 6:
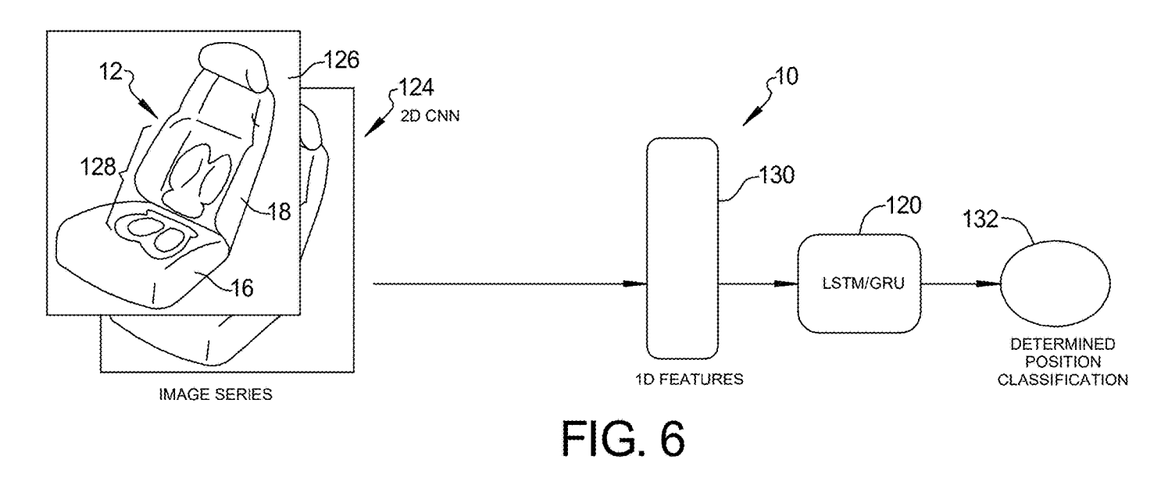
FIG. 6 is a flow diagram for feature extraction using pressure profile 2D sensor data of the vehicle airbag and restraint system of FIG. 1.

Referring to FIG. 6 and again to FIGS. 3 through 5, a second approach to determine the user posture 69 applies a 2D CNN 124 with LSTM and provides an alternative approach that feeds seat pressure profile data as a 2D image at each time step. This approach provides spatial information in addition to temporal data. This approach also requires a greater number of pressure sensors than the 1D time series sensor data 114 described above. The second approach identifies features in the data using 2D CNN on image series 126 of individual seat or user pressure profiles 128. Feature data is extracted using 2D CNN and converted into 1D features 130 and fed to the LSTM/GRU 120 to determine a current user posture and position together with a determined position classification 132 such as ergonomic or non-ergonomic.

Figure 7:
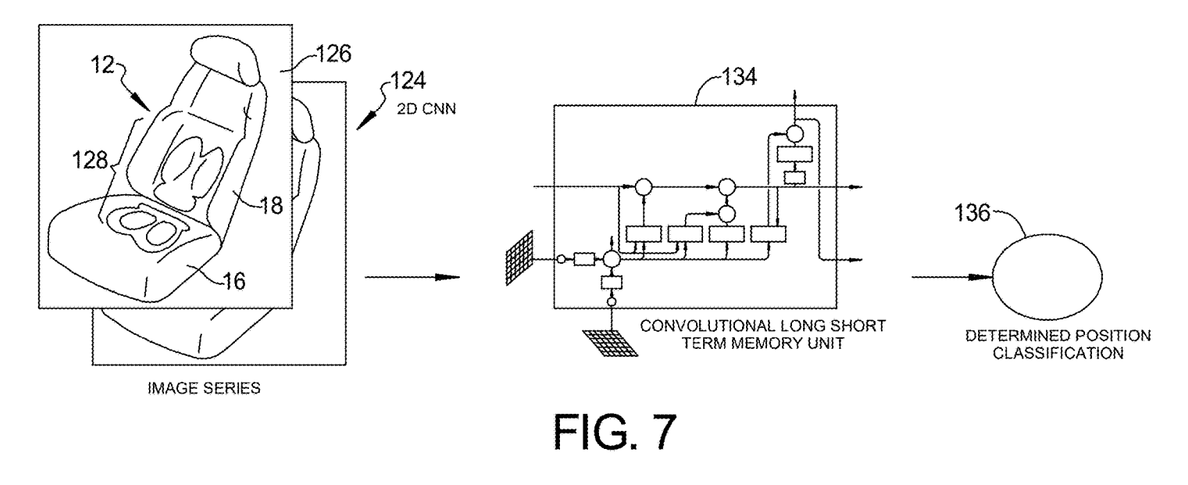
FIG. 7 is flow diagram for feature extraction using direct fed pressure profile 2D sensor data of the vehicle airbag and restraint system of FIG. 1.

Referring to FIG. 7 and again to FIGS. 3 through 6, a third approach to determine the user posture 69 applies the 2D seat pressure profile data 124 similar to described above with respect to FIG. 6 directly into a convolutional long short term memory (ConvLSTM) unit 134 and provides an alternative approach to determine user posture and position together with determined position classification. The third approach identifies features in the data using multiple image series 126 of individual seat pressure profiles 128. Feature data is extracted from the 2D image series 124 and converted in the ConvLSTM unit 134 to determine a current user posture and position together with a determined position classification 136 such as ergonomic or non-ergonomic.

An uncomfortable user posture may be defined as an excessive load on a lower back of the user 20, or an uneven pressure distribution compared to a normally seated or upright position of the user 20. For the comfort system, the comfort system controller 100 will identify a best comfort strategy providing optimum comfort to the user 20 and adjust the comfort elements to provide optimum support and comfort for the identified user posture. The comfort may be personalized using the user comfort preferences or comfort profile data. If it is not possible to provide sufficient support for the identified user posture, the user 20 is notified about a potential uncomfortable posture.

Similarly, an unsafe posture may be defined as any posture which increases injury risk for the user 20 during crash scenarios. The unsafe posture may include but is not limited to the user's legs or user feet 58 being positioned on the control and instrumentation panel 54 or the user 20 leaning forward or sideward away from the user normally upright riding position shown in phantom in FIG. 1.

A determination of an optimal time-of-fire or order or fire of the airbags and/or restraint system deployment includes if the user is leaning sideward, initiation of the side or second airbag 56 is prioritized over the frontal or first airbag 52. If the user 20 is in a reclined posture such as shown in reference to FIG. 1, the user side or second airbag 56 may be fired at a later time for the best protection. In addition, a seatbelt retractor force level may be optimized based on the user posture 69, for example a reclined user 20 has more available travel space. However, if there is a chance of injury due to safety element deployment or a high risk of injury in a given user posture, the user 20 will be notified about the potential risk.

The vehicle airbag and restraint system 10 of the present disclosure provides user position/posture detection and classification using one or more seat pressure profiles. Posture detection algorithm personalization is also provided using individual pressure profiles. User warnings/notifications for unsafe and uncomfortable postures are also provided. Airbag/restraint deployment optimization is further provided using the seat pressure-profiles.

The vehicle airbag and restraint system 10 of the present disclosure includes contact pressure sensors (as few as 8 sensors: 4 in the seat base 16 and 4 in the seat back 18 embedded in the seat measure contact pressure profile. It is possible that vehicle vibration due to vehicle motion or when the vehicle 14 is going over potholes/bumps may affect pressure distribution and the pressure profile. To account for the effects of vehicle motion and/or vibration such as when the vehicle 14 is going over road bumps or potholes on the contact pressure, inertial sensor data from the vehicle 14 and/or the vehicle seat 12 is also used as an additional input to the detection algorithm. Additionally, a vehicle interior profile, a seat geometry and a relative seat position with respect to a vehicle interior configuration may be used for a vehicle specific detection algorithm.

Alternatively, user comfort preferences, for example a user preferred pressure profile, may also be used as an input for a user centric detection algorithm. Airbag/restraint system deployment optimization is performed to minimize user injuries which mitigates against out of position user injuries.

To avoid potential injuries, a dynamic suppression or modification of a sequence of airbag deployment is modified of the vehicle airbag and restraint system 10 is required based on the user posture and/or position. Alternatively, a firing order of different airbags and/or restraint system elements may be optimized based on user posture or position. An approach to dynamically detect safe vice unsafe user position or an unsafe user posture defined when the user 20 is out-of-position via a seat cushion or a user pressure profile over a time history suppresses and optimizes the airbag/restraint system and provides user warnings of an improper position of the user 20.

A vehicle airbag and restraint system 10 of the present disclosure offers several advantages. These include: a system to optimize airbag/restraint system deployment to minimize user injury risk and to warn user of unsafe/uncomfortable postures using seat contact pressure. Algorithms detect and classify safe/unsafe and comfortable/uncomfortable postures using the seat pressure profile along with vehicle interior and seat position/profile. A warning/notification system for unsafe and uncomfortable user postures is provided. An algorithm is provided to suppress/optimize airbag/restraint system deployment using the identified user posture to mitigate user injury risk.

What is claimed is:

1. A vehicle airbag and restraint system, comprising:
   a vehicle seat positioned in a vehicle;
   at least one pressure sensor included with the vehicle seat to sense when a user is in contact with the vehicle seat;
   at least one airbag opened in response to a vehicle crash event;
   a controller determining when the user is seated on the vehicle seat in a position different than a normally upright position thereby defining the user being out-of-position, the controller when the user is out-of-position generating a signal to modify an opening sequence of the at least one airbag;
   a user warning generated if the user is out-of-position;
   an in-vehicle camera system operated to identify if the user is out-of-position;
   an opt-in query requesting the user to enable the vehicle airbag and restraint system; and
   an override query provided when the user warning is generated providing the user an option to use the vehicle airbag and restraint system functionality for a predetermined trigger.

2. The vehicle airbag and restraint system of claim 1, wherein:
   the vehicle seat includes a seat base and a seat back which rotates with respect to the seat base; and
   the at least one pressure sensor is positioned in at least one of the seat base and the seat back.

3. The vehicle airbag and restraint system of claim 2, wherein the at least one pressure sensor includes a forward pressure sensor and a rearward pressure sensor positioned rearward of the forward pressure sensor in the seat base, and a lower pressure sensor and an upper pressure sensor positioned above the lower pressure sensor in the seat back.

4. The vehicle airbag and restraint system of claim 3, wherein:
   the forward pressure sensor and the rearward pressure sensor independently generate pressure signals when the user is positioned on the seat base and applies pressure to one or both of the forward pressure sensor and the rearward pressure sensor; and
   the lower pressure sensor and the upper pressure sensor independently generate pressure signals when the user contacts the seat back and applies pressure to one or both of the lower pressure sensor and the upper pressure sensor.

5. The vehicle airbag and restraint system of claim 3, wherein the at least one pressure sensor defines multiple pressure sensors matrixed into an array and disposed in a mat.

6. The vehicle airbag and restraint system of claim 1, wherein the user when seated on the vehicle seat and positioned against the seat back with the seat back in the normally upright position being in a direct path of the at least one airbag when the at least one airbag opens during the vehicle crash event.

7. The vehicle airbag and restraint system of claim 1, wherein the at least one pressure sensor generates pressure signals defining a user pressure profile.

8. The vehicle airbag and restraint system of claim 1, wherein the user is out-of-position if:
   the vehicle seat is positioned in a reclined position or a semi-reclined position; and/or the user is out-of-position if the user has one or both user legs raised upward to rest one or both user feet on a control and instrumentation panel.

9. A vehicle airbag and restraint system, comprising:
a vehicle seat positioned in a vehicle;
multiple pressure sensors included with the vehicle seat to sense when a user is in contact with different elements of the vehicle seat, including a seat base and a seat back;
a user restraint element provided with the vehicle seat;
at least one airbag opened in response to a vehicle crash event;
a controller determining a user posture of the user seated on the vehicle seat, the controller also including the user posture to infer the user is identified as being out-of-position to generate a signal to perform a dynamic suppression of the at least one airbag and a modification of the user restraint element;
a user warning generated if the user is out-of-position;
an in-vehicle camera system operated to identify if the user is out-of-position;
an opt-in query requesting the user to enable the vehicle airbag and restraint system; and
an override query provided when the user warning is generated providing the user an option to use the vehicle airbag and restraint system functionality for a predetermined trigger.

10. The vehicle airbag and restraint system of claim 9, including:
a seat pressure profile determined from the multiple pressure sensors;
a comfort strategy for the user generated by the controller and applied to adjust multiple comfort elements to provide support and comfort for the user posture; and
an unsafe user position determined from the user posture via the seat pressure profile applied to initiate the dynamic suppression of the at least one airbag and the modification of the user restraint element.

11. The vehicle airbag and restraint system of claim 10, wherein the unsafe user position when determined is used to generate a warning to the user.

12. The vehicle airbag and restraint system of claim 11, wherein a nature and frequency of the warning is adjusted based on user preferences, including:
an uncomfortable posture being defined as one of an excessive load on a lower back of the user, or an uneven pressure distribution of the user on the vehicle seat compared to a predetermined pressure distribution; and
a user comfort is personalized applying user comfort preferences saved by the user.

13. The vehicle airbag and restraint system of claim 12, wherein the user comfort preferences define a preferred pressure profile applied as an input for a user centric detection.

14. The vehicle airbag and restraint system of claim 11, wherein an unsafe user posture is pre-defined when the user posture increases a risk for the user during the vehicle crash event.

15. The vehicle airbag and restraint system of claim 9, including:
inertial sensor data from the vehicle seat applied by the controller to account for vehicle motion and vibration on a contact pressure of the user sensed by the multiple pressure sensors; and
information from vehicle sensors related to road conditions including pot holes, rumble strips and speed bumps, and traffic conditions applied by the controller to mitigate false positive signals directing the dynamic suppression of the at least one airbag and modification of the user restraint element.

* * * * *